W. W. HILL.
MAGAZINE FLOUR SIFTER.
APPLICATION FILED FEB. 25, 1910.

975,951.

Patented Nov. 15, 1910.

Witnesses
Wm. S. McDowell
James A. Koehl

Inventor
Walter W Hill
By Victor J. Evans
Attorney

UNITED STATES PATENT OFFICE.

WALTER WILLIAM HILL, OF SEABORN, TEXAS.

MAGAZINE FLOUR-SIFTER.

975,951.   Specification of Letters Patent.   Patented Nov. 15, 1910.

Application filed February 25, 1910. Serial No. 545,940.

*To all whom it may concern:*

Be it known that I, WALTER WILLIAM HILL, a citizen of the United States of America, residing at Seaborn, in the county of Baylor and State of Texas, have invented new and useful Improvements in Magazine Flour-Sifters, of which the following is a specification.

This invention relates to flour sifters and particularly to an attachment thereto adapted for the reception of a desired quantity of baking soda, baking powder, or the like, the object of the invention residing in the provision of novel means for driving or actuating the agitator and for also feeding to the receptacle of the sifter a predetermined amount of soda or baking powder.

Figure 1:
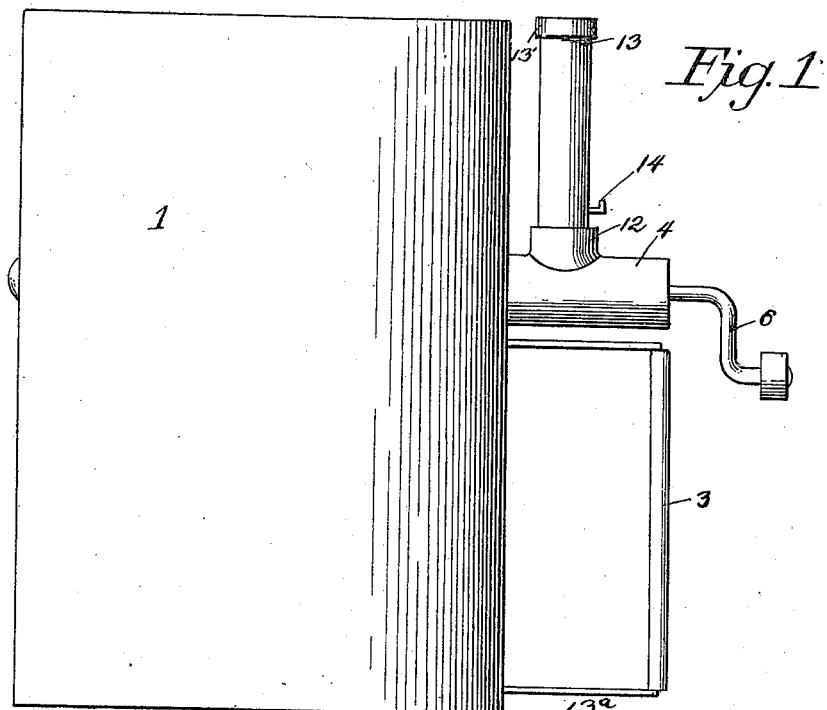
Figure 2:
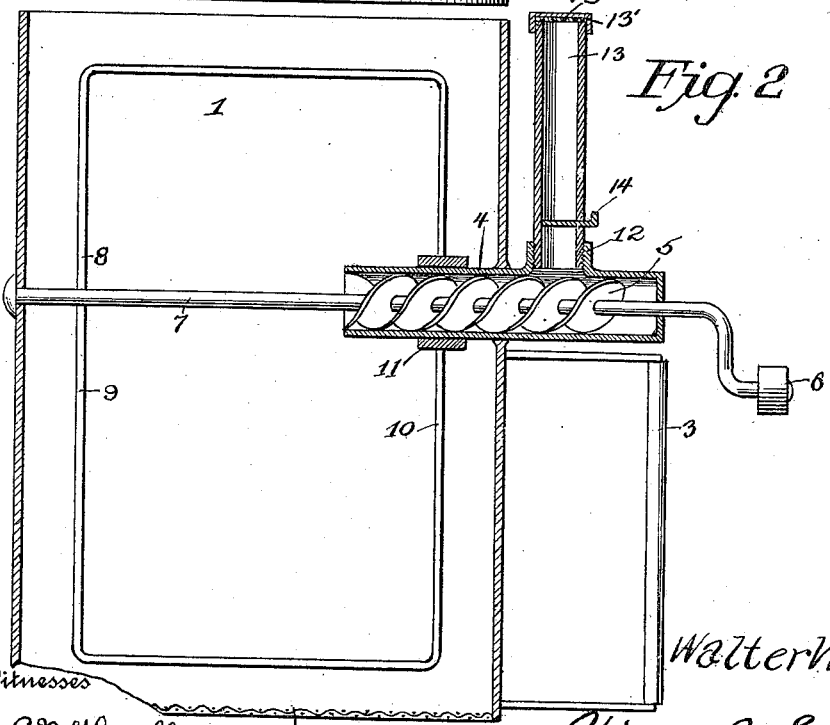

In the drawing, forming a portion of this specification and in which like numerals of reference indicate similar parts in the several views:—Figure 1 is a side elevation of my improved sifter. Fig. 2 is a vertical section through the same.

My improved flour sifter consists of a receptacle 1 which may be of any approved well known construction, the same in the present instance being of cylindrical form and open at one end and partly closed at its other end by a foraminous sheet of material 2. The said receptacle is provided at one side with a suitable handle 3. A bearing member 4 extends partly into the said receptacle 1 and as illustrated, it has mounted therein feeding mechanism or conveying means which in the present instance embodies a worm 5, the outer end of the said worm being provided with a crank handle 6 which is journaled in the closed end of the bearing member 4. The worm shaft is provided with an extension 7 whose outer extremity is journaled in the vertical wall of the receptacle. An agitator 8 is located within the receptacle and as shown, the side portion 9 is fixed in a suitable manner to the extension 7 and the side portion 10 is formed midway between its ends with a hub 11 which is mounted to revolve on the portion of the bearing 4 which is located in the receptacle 1.

The bearing 4 is provided with a receptacle 12 to which is connected a magazine 13 which latter is adapted to contain a quantity of such substance or ingredients that is to be mixed with the flour. The magazine 13 is separated from the receptacle 12 by a sliding gate or equivalent closure 14. It may be mentioned that the receptacle 12 is adapted to contain a teaspoonful of baking powder or the like or any predetermined charge and when the gate is open a sufficient quantity of powder from the magazine 13 will be permitted to enter the receptacle 12. After the desired quantity of powder has been discharged into the receptacle 12 the gate 14 is closed and the crank 6 is revolved to impart to the agitator the desired rotary movement and simultaneously with such movement the worm 5 will of course be revolved to carry or convey the powder which has been discharged into the bearing 4 to the receptacle 1 where it may be mixed and thoroughly agitated with the flour.

The device herein set forth and described not only provides means whereby baking powder or the like can be thoroughly agitated with the flour but the fact that the container for the baking powder is attached directly to the sifter is suggestive sufficiently to the operator and acts as a reminder to insure the mixing of the baking powder with the flour. The magazine 13 is provided at its outer end with a removable cap 13′ and beneath the said cap is a cork or other somewhat elastic packing 13$^a$ which is provided to form an effective air tight joint at the outer end of the magazine. The purpose of the cap 13′ is to prevent the loss of the baking powder when the receptacle 1 is placed in the flour receptacle during the filling operation.

I claim:—

1. A flour sifter comprising a receptacle having a foraminous portion, a powder receptacle located at one side of the first receptacle, a hollow bearing member connecting the receptacles with each other and opening directly into the receptacles, an agitator located in the first receptacle, and a conveying member operable upon movement of the agitator and extending approximately the length of the said bearing member.

2. A flour sifter comprising a receptacle having a foraminous portion, a second receptacle located adjacent to the first receptacle, a bearing member opening directly into the said receptacles, a worm revolubly mounted in the bearing member and having one of its end portions located directly beneath the said second receptacle, a shaft having portions rotatably mounted in the first receptacle and in one end of the said bearing member respectively, and an agitator mounted on said shaft.

3. A flour sifter comprising a receptacle having a foraminous portion, a powder receptacle located adjacent to the first receptacle, a valve located in the powder receptacle, a hollow bearing member connecting the second receptacle with the first receptacle, a feeding element located in the said bearing member and having a portion disposed beneath the said valve, a shaft movable on movement of the feeding element, and an agitator being located in the first receptacle and having a portion connected with the shaft, and a portion mounted for rotation on the said bearing member.

4. A flour sifter comprising a receptacle having a foraminous portion, a second receptacle located adjacent to the first receptacle, a hollow bearing member having an open end portion opening directly into the first receptacle, the said second receptacle being connected with the said hollow bearing member and arranged in direct communication therewith, a feeding element movably mounted in the said hollow bearing member, and an agitator located in the first receptacle and movable on movements of the feeding element.

In testimony whereof I affix my signature in presence of two witnesses.

WALTER WILLIAM HILL.

Witnesses:
 EUGENE MILLS,
 LUTHER BROWN.